United States Patent
Wang et al.

(10) Patent No.: US 10,994,693 B2
(45) Date of Patent: May 4, 2021

(54) AIRBAG AND AIRBAG ASSEMBLY

(71) Applicant: AUTOLIV DEVELOPMENT AB, Vargarda (SE)

(72) Inventors: Liang Wang, Shanghai (CN); Jin Zhang, Shanghai (CN); Cheng Wu, Shanghai (CN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 295 days.

(21) Appl. No.: 16/089,437

(22) PCT Filed: Dec. 30, 2016

(86) PCT No.: PCT/CN2016/113482
§ 371 (c)(1),
(2) Date: Sep. 28, 2018

(87) PCT Pub. No.: WO2017/166882
PCT Pub. Date: Oct. 5, 2017

(65) Prior Publication Data
US 2020/0298788 A1   Sep. 24, 2020

(30) Foreign Application Priority Data
Mar. 29, 2016 (CN) .......................... 201610188115.7

(51) Int. Cl.
*B60R 21/237* (2006.01)
*B60R 21/264* (2006.01)

(52) U.S. Cl.
CPC .......... *B60R 21/237* (2013.01); *B60R 21/264* (2013.01)

(58) Field of Classification Search
CPC ............................ B60R 21/237; B60R 21/264
See application file for complete search history.

(56) References Cited

U.S. PATENT DOCUMENTS

| | | | |
|---|---|---|---|
| 5,472,233 A | 12/1995 | Horiuchu et al. | |
| 6,186,544 B1 | 2/2001 | Igawa | |
| 6,976,705 B2 | 12/2005 | Klaiber et al. | |
| 7,243,940 B2 * | 7/2007 | Tesch | B60R 21/232 280/728.1 |

(Continued)

FOREIGN PATENT DOCUMENTS

| | | |
|---|---|---|
| CN | 1495073 A | 5/2004 |
| CN | 103057510 A | 4/2013 |
| JP | 2002-178866 A | 6/2002 |

OTHER PUBLICATIONS

International Search Report of PCT/CN2016/113482 dated Mar. 21, 2017.

*Primary Examiner* — Faye M Fleming
(74) *Attorney, Agent, or Firm* — Dickinson Wright PLLC

(57) ABSTRACT

An airbag and an airbag assembly including a gas generator and an airbag. The airbag (10) forms a first end (11) and a second end (12), the first end (11) being a free end of the airbag, and the second end (12) being used for fixing the airbag to a mounting position. The airbag (10) forms a folding portion (13) and a rolling portion (14) in the collapsed stat. The folding portion (13) is formed by folding one part of the airbag in an "N" shape; the rolling portion (14) surrounds a periphery of the folding portion (13), so that the folding portion (13) is surrounded by an inner side of the rolling portion (14).

14 Claims, 5 Drawing Sheets

(56) References Cited

U.S. PATENT DOCUMENTS

| | | | |
|---|---|---|---|
| 7,404,570 B2* | 7/2008 | Miyata | B62J 27/00 |
| | | | 280/728.2 |
| 7,527,287 B2 | 5/2009 | Kjell et al. | |
| 7,770,918 B2 | 8/2010 | Bernstsson et al. | |
| 7,845,674 B2 | 12/2010 | Bernstsson et al. | |
| 7,967,332 B2 | 6/2011 | Karlsson | |
| 8,220,831 B2 | 7/2012 | Kjell et al. | |
| 9,663,063 B2* | 5/2017 | Kunitake | B60R 21/237 |
| 9,975,519 B2* | 5/2018 | Kobayashi | B60N 2/42 |
| 2005/0070414 A1* | 3/2005 | Schneider | B60R 21/237 |
| | | | 493/405 |
| 2016/0001732 A1 | 1/2016 | Asada et al. | |
| 2020/0198568 A1* | 6/2020 | Onohara | B60R 21/201 |
| 2020/0269799 A1* | 8/2020 | Iwata | B60R 21/237 |

\* cited by examiner

AIRBAG AND AIRBAG ASSEMBLY

CROSS-REFERENCE TO RELATED APPLICATIONS

This application is a 35 U.S.C. § 371 national phase application of PCT International Application No. PCT/CN2016/113482, filed Dec. 30, 2016, which claims the benefit of priority under 35 U.S.C. § 119 to Chinese Patent Application No. 201610188115.7, filed Mar. 29, 2016, the contents of which are incorporated herein by reference in their entirety.

TECHNICAL FIELD

The present invention relates to a safety device for vehicles, and in particular, to an airbag and an airbag assembly.

BACKGROUND

Airbags used in vehicles are important devices frequently used in emergency situations to protect occupants within vehicles from injury. As one type of airbags, a curtain airbag is typically mounted at an upper portion of a side door and positioned at an edge of a vehicle structure under the inner roof. Moreover, the curtain airbag is inflated when a vehicle is impacted, so that it expands and is deployed in an inflated state against a vehicle side structure, such as a side window, inside the vehicle. In this way, the occupants can be restrained from directly hitting the inside structures of the vehicle or being thrown out of a vehicle window. An example of such curtain airbag is shown in FIGS. 1 and 2. Specifically, FIG. 1 shows a state in which a curtain airbag 1 in a collapsed state is roll-folded and stored in a space under a vehicle side structure 3 (e.g., a side door) and an inner roof 2 when viewed in the length direction of a vehicle (i.e., a left-and-right direction of FIG. 1 is a width direction of the vehicle). FIG. 2 shows that the curtain airbag 1 in a deployed state in which it is inflated and expanded in the length direction of the vehicle (i.e., a left-and-right direction of FIG. 2), and the airbag is deployed downward along the vehicle side structure 3, so as to provide protection for occupants in the occupant protection area.

Because a mounting space of an airbag is very limited, the airbag is typically mounted in a rolled state or a folded and collapsed state in a particular space of a vehicle. FIGS. 3 and 4 show two common roll-folding modes for airbags in the prior art: a roll-folding manner (as shown in FIG. 3) and an N-fold manner (as shown in FIG. 4). FIG. 3 shows a schematic side view of an airbag folded in a roll-folding manner. An airbag assembly formed in such roll-folding mode easily maintains its external shape. Therefore, an airbag assembly can maintain its shape without additionally providing enclosures such as a seal cover when mounted to a vehicle. However, the diameter of such airbag assembly is relatively large and thus often is unable to meet the limited packaging space requirement in the vehicle. FIG. 4 shows that a cross section of an airbag folded in an N-fold manner is relatively flat; a small space is occupied in the vehicle; but a seal cover 4 is required to maintain the size and shape. However, because the outer shape of the airbag folded in the N-fold manner is not flat, the seal cover 4 usually needs to enclose the airbag substantially over the entire extended length of the airbag. Because of the requirement for the seal covers, reducing cost becomes difficult.

Therefore, the airbags folded, as described above, occupy a large space in the vehicle and have a high mounting and fixation cost.

SUMMARY

In order to solve the above-mentioned problems, the present invention provides an airbag, adapted to constitute a deployed state and a collapsed state, the airbag being capable of providing protection for occupants between the occupants and the inside of a vehicle when the airbag is inflated and expanded to be in the deployed state. The airbag is being capable of being accommodated in a predetermined space in the vehicle when in the collapsed state; the airbag defining at least a first end and a second end, the first end being a free end of the airbag, and the second end being used for fixing the airbag to a mounting position. The airbag further has a folding portion and a rolling portion when in the collapsed state. The folding portion is formed by folding one part of the airbag in an "N" shape and the rolling portion surrounds a periphery of the folding portion, so that the folding portion is completely surrounded by an inner side of the rolling portion; and the first end is also positioned at the inner side of the rolling portion.

According to an embodiment of the present invention, the rolling portion extends from the folding portion and integrally and continuously surrounds the periphery of the folding portion.

According to an embodiment of the present invention, the rolling portion is branched to form a first rolling sub-portion and a second rolling sub-portion; the first rolling sub-portion extends from the folding portion and surrounds at least one part of the periphery of the folding portion; and the second rolling sub-portion is branched from the first rolling sub-portion and surrounds at least one part of the periphery of the folding portion.

Herein, in a case where positions of the first rolling sub-portion and the second rolling sub-portion are branched are used as origins, an extending direction of the first rolling sub-portion surrounding around at least one part of the periphery of the folding portion is opposite to an extending direction of the second rolling sub-portion surrounding around at least one part of the folding portion.

Preferably, the rolling portion surrounds the periphery of the folding portion for only about one turn.

Preferably, the folding portion encompasses the first end.

The present invention further provides an airbag assembly, having a gas generator; and the airbag according to the present invention.

According to one embodiment of the present invention, the airbag assembly further includes a mounting device for fixing the airbag to a corresponding mounting position, the mounting device being fixed to the second end of the airbag.

Preferably, the mounting device is configured to surround a buckle of the airbag; and one part of the buckle is fixed to the second end of the airbag assembly.

The airbag provided by the present invention has the advantages of needing only to take a small space of a vehicle and a low mounting and fixing cost.

BRIEF DESCRIPTION OF THE DRAWINGS

The present invention will be described in detail below with reference to the accompanying drawings.

DETAILED DESCRIPTION

Figure 1:
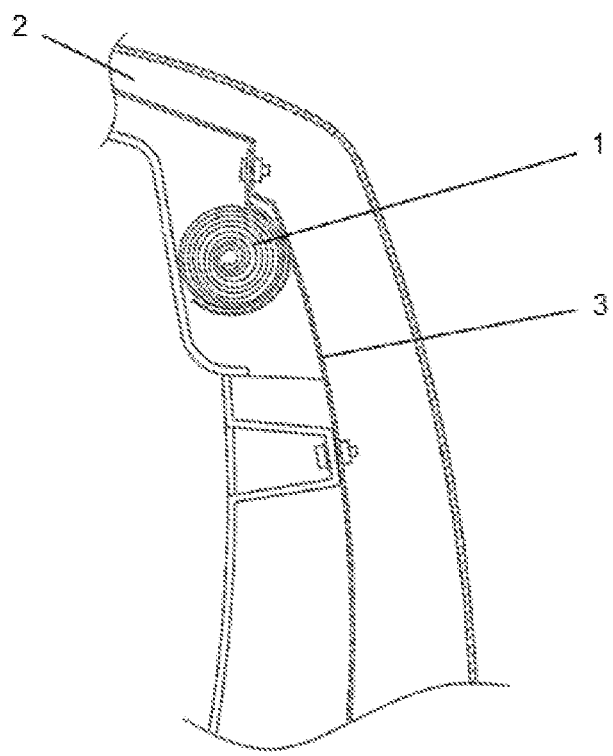
FIG. 1 shows a schematic view of a mounting position of an airbag 1 in a vehicle when viewed from a length direction of the vehicle according to the prior art, the airbag 1 being in a collapsed state.

Specific implementations of an airbag according to the present invention will be described below with reference to the accompanying drawings. The detailed description and drawings below are used for exemplarily illustrating embodiment of the present invention. The present invention is not limited to the described preferred embodiments.

In addition, spatially related terms (such as "upper", "lower", "left", and "right") are used to describe a relative positional relationship between an element and another element shown in the drawings. Therefore, spatially related terms can be applied to directions that are different from those shown in the drawings in actual application. Although all of these spatially related terms refer to the directions shown in the drawings for ease of explanation, those skilled in the art could understand that directions different from those shown in the drawings may be used. The same or similar reference numerals denote the same or similar structures in the airbag.

The airbag according to the embodiments of the present invention will be described below with reference to the accompanying drawings.

Figure 2:
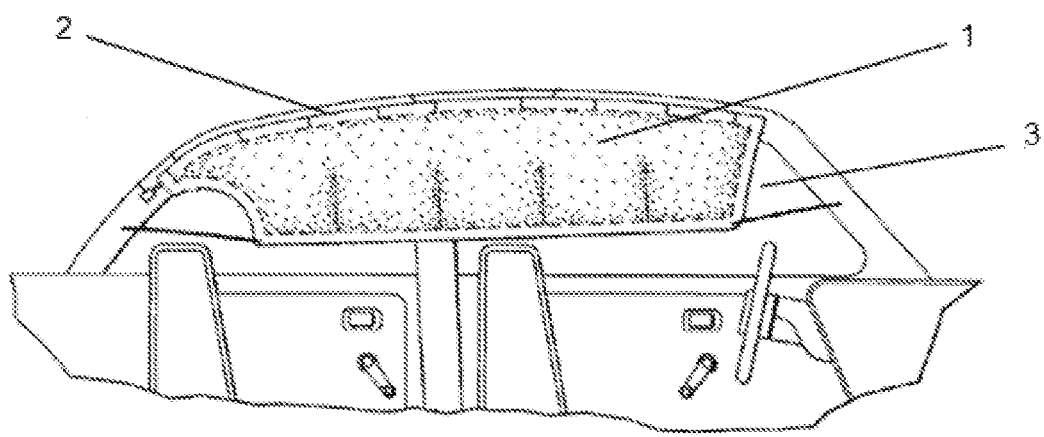
FIG. 2 shows a schematic view of a position of the airbag 1 in the vehicle when viewed from a width direction of the vehicle according to the prior art, the airbag being in a deployed state.
Figure 3:
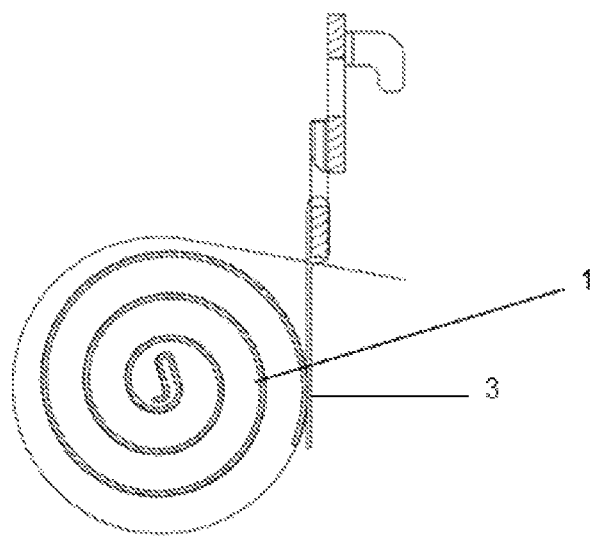
FIG. 3 shows a schematic side sectional view of a roll-folding manner of the airbag 1 according to the prior art.
Figure 4:
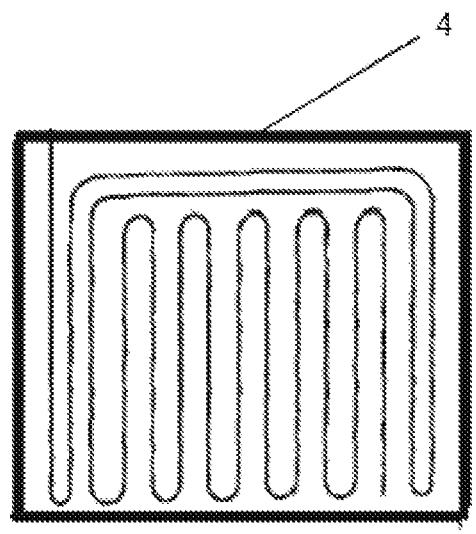
FIG. 4 shows a schematic side sectional view of an N-fold manner of the airbag 1 according to the prior art.
Figure 5:
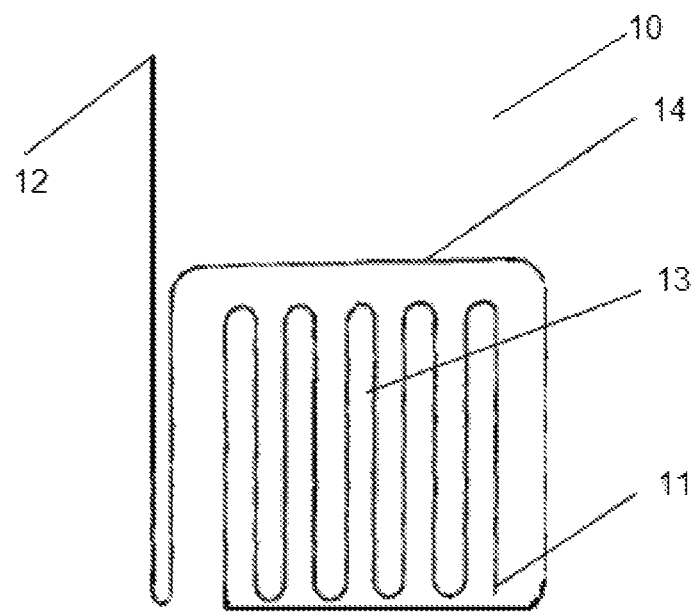
FIG. 5 shows a side sectional view of an airbag according to a first embodiment of the present invention.

FIG. 5 shows a schematic side sectional view of an airbag 10 according to a first embodiment of the present invention. As shown in FIG. 5, the airbag 10 has a first end 11 and a second end 12. Either the first end 11 or the second end 12 may be a free end. The other end opposite the free end is used to fix the airbag 10 to a mounting position of a vehicle. For example, in this embodiment, the first end 11 is a free end of the airbag 10; and the second end 12 is used to fix the airbag 10 to a predetermined mounting position in the vehicle. The mounting position of the airbag 10 in a vehicle can refer to a mounting position of a curtain airbag 1 as shown in FIGS. 1 and 2. That is, the airbag 10 is positioned in a space under a vehicle side structure (e.g., a side door) and an inner roof.

The airbag 10 shown in FIG. 5 is shown in a collapsed state and has a folding portion 13 and a rolling portion 14. The folding portion 13 is formed by folding one part of the airbag 10 in an "N" shape. The rolling portion 14 extends from the folding portion 13. Moreover, the rolling portion 14 integrally and continuously surrounds a periphery of the folding portion 13. In the first embodiment, the rolling portion 14 surrounds the periphery of the folding portion 13 for about one turn, so that the folding portion 13 is completely surrounded by an inner side of the rolling portion 14; and the first end 11 is also positioned at the inner side of the rolling portion 14. The initial portion of the rolling portion 14 is reversely folded against a portion of the airbag extending from second end 12.

Since the rolling portion 14 of the airbag 10 according to this embodiment of the present invention completely surrounds the folding portion 13, the shape of the airbag 10 can be maintained using the rolling portion 14 which serves as one part of the airbag 10. Therefore, the volume may be reduced by improving the compacting procedure of the "N" shape folding; and a seal cover is not needed for the airbag 10 to sufficiently maintain the shape thereof when the airbag is in the collapsed state. In this way, the cost for mounting and fixing the airbag 10 is greatly reduced. At the same time, the cross section of the airbag 10 having the folding portion 13 may be configured to be flat to optimize the occupied space.

When it is desired to inflate and deploy the airbag 10, for example, in the event of a vehicle accident, the airbag 10 is inflated so as to expand and be deployed downward against a vehicle side structure 3; and the first end 11 is expanded to form a free end to provide protection for occupants in an occupant protection area.

In addition, as an example, when the airbag 10 shown in FIG. 5 is manufactured, one part of the airbag may be folded in an "N" shape from the first end 11 to form the folding portion 13. Next, the remaining part rolls around the folding portion 13 to form the rolling portion 14, so that the folding portion is completely surrounded by the inner side of the rolling portion 14. Accordingly, the first end is also positioned at the inner side of the rolling portion 14.

Figure 6:
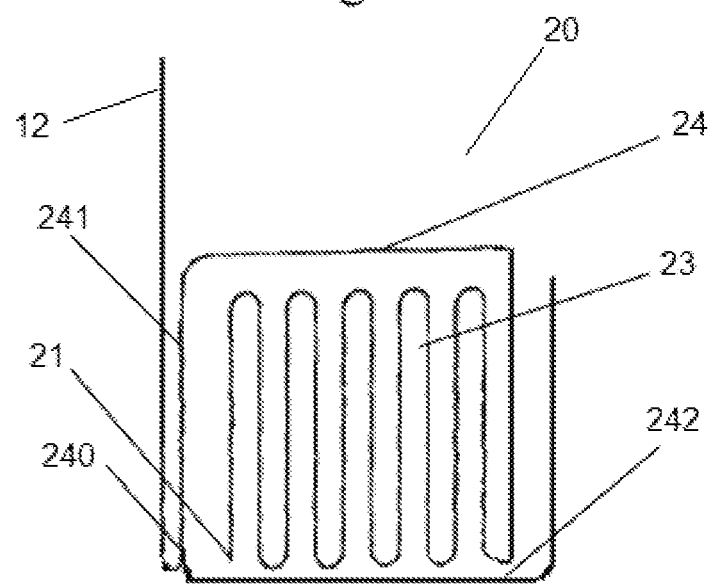
FIG. 6 shows a side sectional view of an airbag according to a second embodiment of the present invention.

FIG. 6 shows a side sectional view of an airbag 20 according to a second embodiment of the present invention. Airbag 20 has substantially the same configuration as airbag 10. For this and later embodiments, element numbers are indexed by multiples of 10, yet have similar functions and configurations as previously described. A major difference is that a rolling portion 24 of the airbag 20 is branched into a first rolling sub-portion 241 and a second rolling sub-portion 242. The first rolling sub-portion 241 extends from a folding portion 23 and surrounds at least one part of a periphery of the folding portion 23. The second rolling sub-portion 242 is branched from the first rolling sub-portion 241 and surrounds at least one part of the periphery of the folding portion 23.

In the embodiment shown in FIG. 6, if positions 240 where the first rolling sub-portion 241 and the second rolling sub-portion 242 are branched are taken as origins, then an extending direction (clockwise) of the first rolling sub-portion 241 surrounding at least one part of the periphery of the folding portion 23 is opposite to an extending direction (counter-clockwise) of the second rolling sub-portion 242 surrounding at least one part of the folding portion 23. Together the first rolling sub-portion 241 and the second rolling sub-portion 242 completely surround the folding portion 23. In addition, the first end 21 is also positioned at the inner side of the rolling portion 24.

The rolling portion 24 of the airbag 20 according to this embodiment of the present invention forms the first rolling sub-portion 241 and the second rolling sub-portion 242. Since together the first rolling sub-portion 241 and the second rolling sub-portion 242 completely surround the folding portion 23, the airbag 20 no longer needs a seal cover to maintain the shape in the collapsed state. In this way, the cost for mounting and fixing the airbag is reduced. At the same time, the cross section of the airbag 20 having the folding portion 23 is flat, so the space occupied in the vehicle is small.

In airbag 20 of the present invention, the second rolling sub-portion 242 may be formed integrally with the first rolling sub-portion 241, or may also be mounted, as a separate component, to the first rolling sub-portion 241 by sewing, bonding, and other manners. For example, the collapsed state of the airbag may be better maintained by mounting one end of the second rolling sub-portion 242 to a position of the first rolling sub-portion 241 proximate to the second end of the air bag and then rolling the second rolling sub-portion 242 around the folding portion.

The expansion and deployment process of the airbag 20 according to this embodiment of the present invention is similar to that of airbag 10 and will not be described in detail herein.

In addition, as an example, when the airbag 20 is manufactured, one part of the airbag may be folded in an "N" shape from the first end 21 to form the folding portion 23. Next, the remaining part rolls around the folding portion 23 to, for example, a branching point 240, to form the first rolling sub-portion 241. Branched portions continue to roll from the branching point 240 to form the second rolling sub-portion 242. In this way, the folding portion is completely surrounded by the inner side of the rolling portion 24. Moreover, the first end 23 is also positioned at the inner side of the rolling portion 24.

Although some embodiments of the airbag according to the present invention are described previously, the present invention is not limited thereto. Other implementations are also possible.

Figure 7:
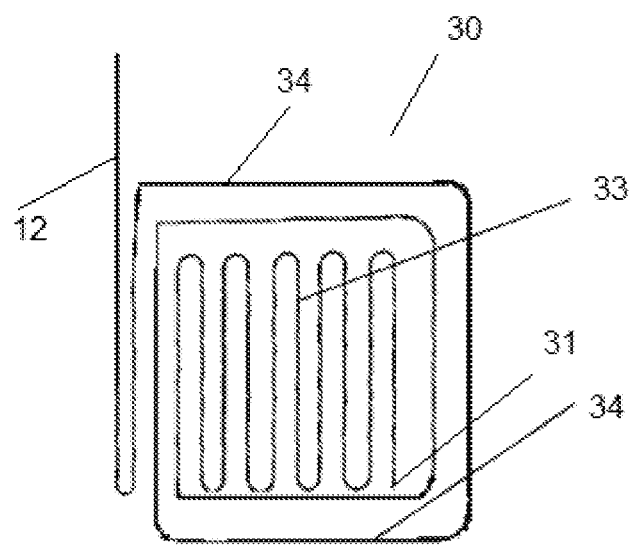
FIG. 7 shows a folding manner of the airbag according to another embodiment of the present invention.

As with airbag 10 of the present invention, as shown in FIG. 5, the rolling portion 14 surrounds the periphery of the folding portion 13 for only about one turn. However, those skilled in the art could understand that the rolling portion 14 may also surround the periphery of the folding portion 13 for more than one turn or even multiple turns or portions of turns. For example, as shown in FIG. 7, the rolling portion 14 of airbag 30 surrounds the periphery of the folding portion 33 for about two turns. With a large number of turns, the shape of the airbag in the folded collapsed state can be better maintained, but the deployment speed of the airbag may be adversely affected.

Figure 8:
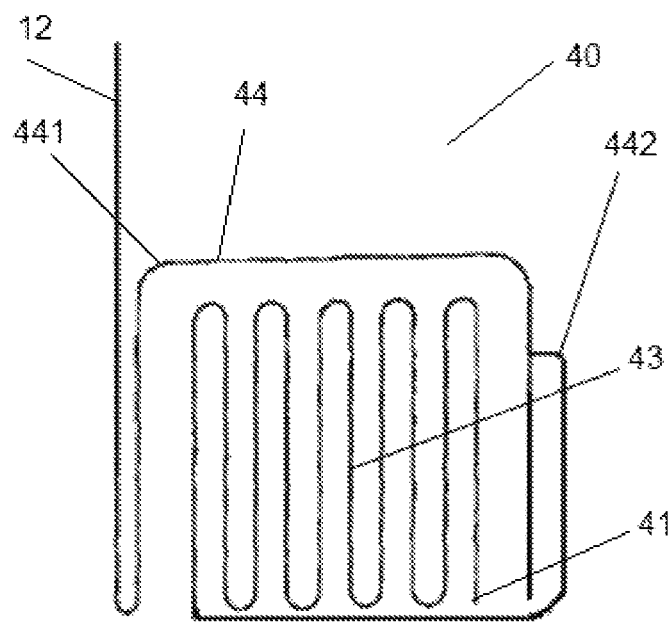
FIG. 8 shows a folding manner of the airbag according to another embodiment of the present invention.

As in the case of airbag 20 of the present invention, as shown in FIG. 6, an extending direction of the first rolling sub-portion 241 surrounding at least one part of the periphery of the folding portion 23 is opposite to an extending direction of the second rolling sub-portion 242 surrounding at least one part of the periphery of the folding portion 23. However, those skilled in the art could understand that the present invention is not limited to the implementation shown in FIG. 8. For example, the present invention may further be embodied in an implementation of airbag 40 as shown in FIG. 8. That is, the extending direction of the first rolling sub-portion 441 surrounding at least one part of the periphery of the folding portion 43 is the same as the extending direction of the second rolling sub-portion 442 surrounding at least one part of the periphery of the folding portion 43.

Figure 9:
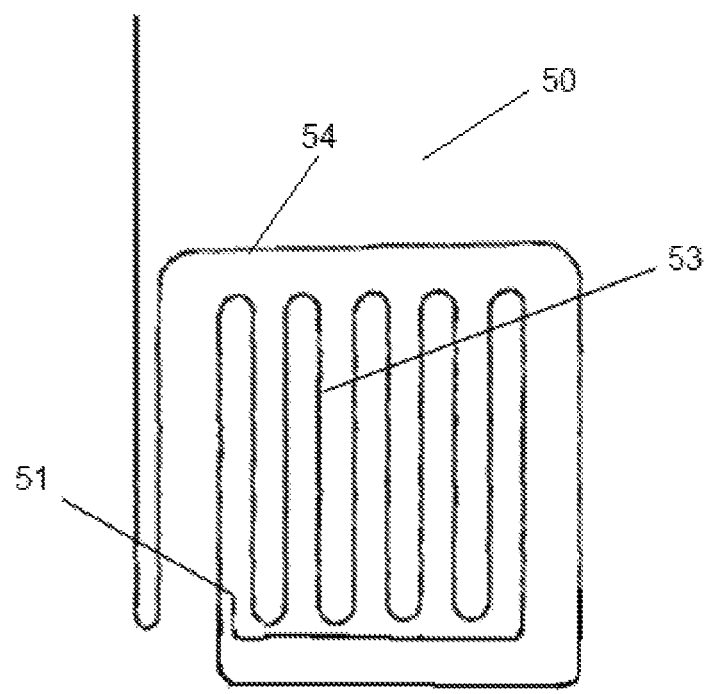
FIG. 9 shows a folding manner of the airbag according to another embodiment of the present invention.

In the foregoing embodiments of the present invention, the folding portion includes the first end as the free end. That is, at the time of manufacturing, the folding portion may be formed by firstly folding the free end in an "N" shape. However, those skilled in the art could understand that the present invention is not limited thereto. For example, the present invention may also include an implementation of an airbag 50 as shown in FIG. 9. That is, the first end 51 is not within the folding portion 53 and thus is not one part of the folding portion 53. Here, the first end 51 is tucked into adjacent folds of folding porting 53. In this embodiment, for example, at the time of manufacturing, folding may be performed from a position, which is at a certain distance from the free end 51, to form the folding portion 53. In addition, the free end 51 as one part of a starting point may also be formed to roll around one part or even the periphery of the folding portion. It will also be understood that in this case, if the length from the free end 51 to the folding portion 53 is sufficiently long, it is also possible to form one part thereof as another folding portion. In all of these cases, it is possible to achieve the object of the present invention by forming the outermost rolling portion to surround the periphery of the folding portion and allowing the first end to be positioned inside the rolling portion.

In addition to the airbag described above, the present invention further provides an airbag assembly. The airbag assembly includes a gas generator and the airbag according to the foregoing embodiments. The gas generator is used to inflate the airbag when detonated, so as to inflate and deploy the airbag.

Figure 10:
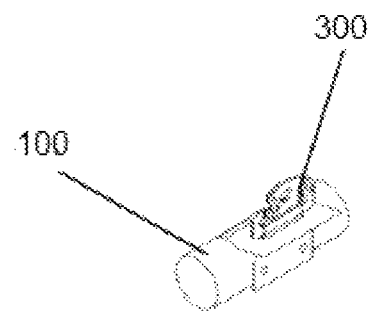
FIG. 10 shows a schematic view of a bracket for fixing the airbag to a mounting position according to the present invention.

More specifically, the airbag assembly may further include a bracket 300 for fixing the airbag to a corresponding mounting position. As shown in FIG. 10, a schematic diagram of the vicinity of the bracket 300 is shown. In FIG. 10, the airbag 100 is not fully shown, but only one section thereof near the bracket 300 is shown. One part of the bracket 300 is fixed to the second end of the airbag (not shown in the drawing) and surrounds the airbag 100. Another part of the bracket 300 protrudes through an opening of an end of the bracket to surround the outer periphery of the airbag. The protruded part can be used for fixing the airbag to the corresponding mounting position. Thus, the bracket 300 can maintain the shape of the airbag 100 and can easily mount the airbag assembly.

Since the airbag according to the present invention itself can maintain a smooth integrated shape, it is possible to eliminate the need for a seal cover. Moreover, it is possible to use a simple device such as a bracket to maintain the shape and perform the mounting.

Those skilled in the art could understand that the mounting device of the airbag assembly is not limited to the above-described bracket. Those skilled in the art could use any mounting device that can fix the airbag to a predetermined mounting position of the vehicle according to specific situations. For example, the airbag can be fixed to the predetermined mounting position of the vehicle by use of concave and hooked members and the like and/or in a way of riveting, bonding, snapping and the like depending on specific application scenarios.

As described above, although the exemplary embodiments of the present invention have been described with reference to the accompanying drawings in the description, the present invention is not limited to the above-mentioned specific implementations. While the above description constitutes the preferred embodiment of the present invention, it will be appreciated that the invention is susceptible to modification, variation and change without departing from the proper scope and fair meaning of the accompanying claims.

The invention claimed is:

1. An airbag adapted to constitute a deployed state and a collapsed state, the airbag being capable of providing protection for an occupant of a vehicle between the occupant and the inside of the vehicle when the airbag is inflated and expanded to be in the deployed state, and being capable of being accommodated in a predetermined space in the vehicle when in the collapsed state, comprising;

the airbag forming at least a first end and a second end, the first end being a free end of the airbag, and the second end being used for fixing the airbag to a mounting position of the vehicle; and the airbag forming a folding portion and a rolling portion when in the collapsed state, wherein the folding portion is formed by folding one part of the airbag in an "N" shape; the rolling portion surrounds a periphery of the folding portion, so that the folding portion is completely surrounded by an inner side of the rolling portion; and the first end is also positioned at the inner side of the rolling portion, and wherein the rolling portion is branched to form a first rolling sub-portion and a second rolling sub-portion; the first rolling sub-portion extends from the folding portion and surrounds at least a first part of the periphery of the folding portion; and the second rolling sub-portion is branched from the first rolling sub-portion and surrounds at least a second part of the periphery of the folding portion.

2. The airbag according to claim 1 further comprising, wherein the rolling portion extends from the folding portion and integrally and continuously surrounds the periphery of the folding portion.

3. The airbag according to claim 1 further comprising, a position at which the first rolling sub-portion and the second rolling sub-portion are branched define at least one origin, an extending direction of the first rolling sub-portion surrounding at the first part of the periphery of the folding portion is opposite to an extending direction of the second rolling sub-portion surrounding the second part of the folding portion.

4. The airbag according to claim 1 further comprising, the rolling portion surrounds the periphery of the folding portion for about one turn.

5. The airbag according to claim 1 wherein the folding portion comprises the first end.

6. The airbag according to claim 4 wherein the folding portion comprises the first end.

7. An airbag assembly, comprising,
a gas generator; and
the airbag according to claim 1.

8. The airbag assembly according to claim 7 further comprising,
a mounting device for fixing the airbag to a corresponding mounting position, one part of the mounting device being fixed to the second end of the airbag.

9. The airbag assembly according to claim 8 wherein the mounting device is configured to surround an outer periphery of the airbag; and another part of the mounting device is fixed to the corresponding mounting position.

10. The airbag assembly according to claim 1 further comprising, the rolling portion surrounds the periphery of the folding portion for about two turns.

11. The airbag according to claim 1 further comprising, a position at which the first rolling sub-portion and the second rolling sub-portion are branched to define at least one origin, an extending direction of the first rolling sub-portion surrounding at the first part of the periphery of the folding portion is the same as the an extending direction of the second rolling sub-portion surrounding the second part of the folding portion.

12. The airbag according to claim 1 further comprising, the first end is tucked into a pair of adjacent folds of the folding portion.

13. An airbag adapted to constitute a deployed state and a collapsed state, the airbag being capable of providing protection for an occupant of a vehicle between the occupant and the inside of the vehicle when the airbag is inflated and expanded to be in the deployed state, and being capable of being accommodated in a predetermined space in the vehicle when in the collapsed state, comprising;

the airbag forming at least a first end and a second end, the first end being a free end of the airbag, and the second end being used for fixing the airbag to a mounting position of the vehicle; and the airbag forming a folding portion and a rolling portion when in the collapsed state, wherein the folding portion is formed by folding one part of the airbag in an "N" shape; the rolling portion surrounds a periphery of the folding portion, so that the folding portion is completely surrounded by an inner side of the rolling portion; and the first end is also positioned at the inner side of the rolling portion, and the first end is tucked into a pair of adjacent folds of the folding portion.

14. An airbag assembly, comprising,
a gas generator;
an airbag adapted to constitute a deployed state and a collapsed state, the airbag being capable of providing protection for an occupant of a vehicle between the occupant and the inside of the vehicle when the airbag is inflated and expanded to be in the deployed state, and being capable of being accommodated in a predetermined space in the vehicle when in the collapsed state, comprising;

the airbag forming at least a first end and a second end, the first end being a free end of the airbag, and the second end being used for fixing the airbag to a mounting position of the vehicle; and the airbag forming a folding portion and a rolling portion when in the collapsed state, wherein the folding portion is formed by folding one part of the airbag in an "N" shape; the rolling portion surrounds a periphery of the folding portion, so that the folding portion is completely surrounded by an inner side of the rolling portion; and the first end is also positioned at the inner side of the rolling portion; and a mounting device for fixing the airbag to a corresponding mounting position, one part of the mounting device being fixed to the second end of the airbag, wherein the mounting device is configured to surround an outer periphery of the airbag and another part of the mounting device is fixed to the corresponding mounting position.

* * * * *